United States Patent
Liu et al.

(10) Patent No.: US 10,708,487 B2
(45) Date of Patent: Jul. 7, 2020

(54) IMAGE PROCESSING FOR SATURATED PIXELS

(71) Applicant: QUALCOMM Incorporated, San Diego, CA (US)

(72) Inventors: Lee-Kang Liu, San Diego, CA (US); Micha Galor Gluskin, San Diego, CA (US); Ying Noyes, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 85 days.

(21) Appl. No.: 16/114,666

(22) Filed: Aug. 28, 2018

(65) Prior Publication Data
US 2020/0077029 A1    Mar. 5, 2020

(51) Int. Cl.
*H04N 5/232* (2006.01)
*H04N 5/369* (2011.01)

(52) U.S. Cl.
CPC ... *H04N 5/232122* (2018.08); *H04N 5/36961* (2018.08); *H04N 5/36965* (2018.08)

(58) Field of Classification Search
CPC ......... H04N 5/232122; H04N 5/36961; H04N 5/36965
See application file for complete search history.

(56) References Cited

U.S. PATENT DOCUMENTS

| | | | |
|---|---|---|---|
| 8,619,168 B2 | 12/2013 | Choi et al. | |
| 9,380,202 B2* | 6/2016 | Kunieda | H04N 5/23212 |
| 9,515,105 B2 | 12/2016 | Barna et al. | |
| 9,578,223 B2 | 2/2017 | Luo et al. | |
| 9,838,590 B2 | 12/2017 | Zhang et al. | |
| 2018/0176452 A1* | 6/2018 | Nikkanen | H04N 5/23212 |

OTHER PUBLICATIONS

Samsung Newsroom: "Samsung Elevates Mobile Phone Picture Quality with Dual Pixel Technology in its Newest Image Sensor," Mar. 9, 2016, Retrieved from internet on Mar. 20, 2018, https://news.samsung.com/global/samsung-elevates-mobile-phone-picture-quality-with-dual-pixel-technology-in-its-newest-image-sensor, pp. 1-3.

* cited by examiner

*Primary Examiner* — Twyler L Haskins
*Assistant Examiner* — Angel L Garces-Rivera
(74) *Attorney, Agent, or Firm* — Paradice and Li LLP

(57) ABSTRACT

Aspects of the present disclosure relate to systems and methods for decorrelating one or more saturated regions of an image. In one example, a first phase image and a corresponding second phase image may be obtained. One or more saturated regions of the first phase image and second phase image may be determined. A weight may be applied to each pixel in the one or more saturated regions of the first and second phase images may be weighted to generate a weighted first phase image and a weighted second phase image, and one or more image processing operations may be performed on the weighted first and second phase images.

27 Claims, 7 Drawing Sheets

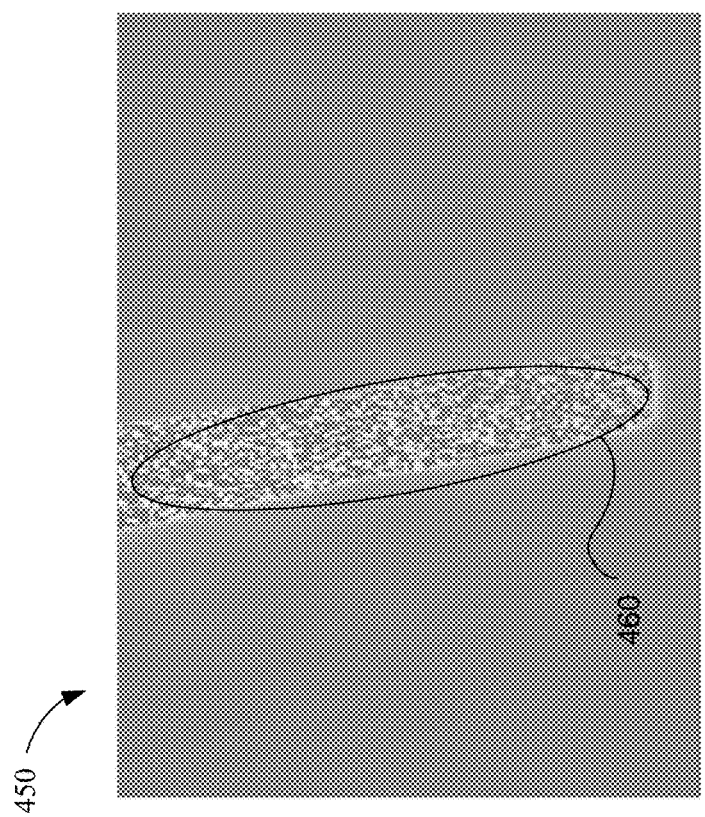
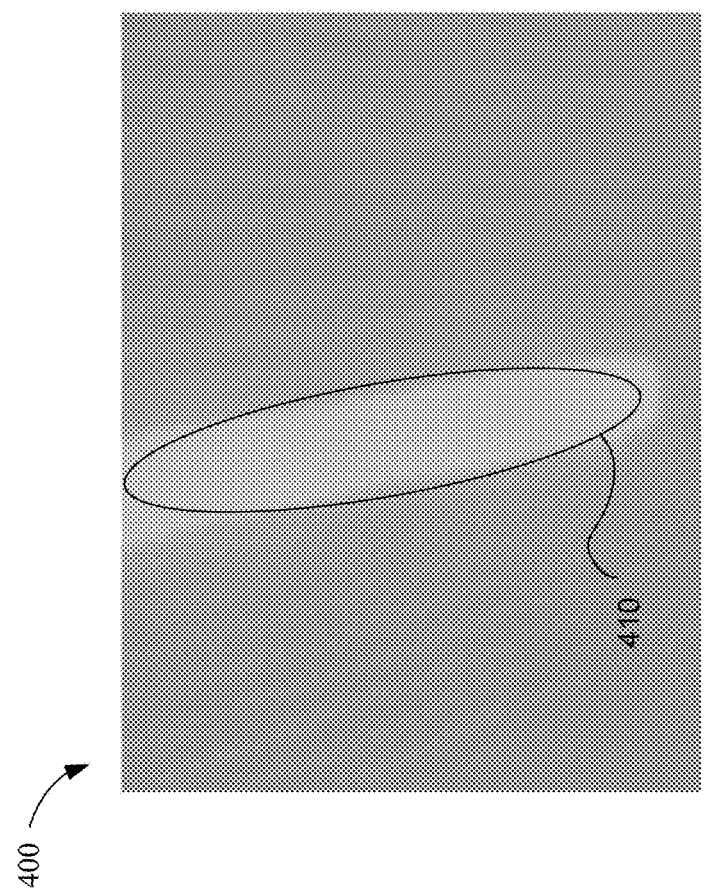
FIG. 4A
FIG. 4B

IMAGE PROCESSING FOR SATURATED PIXELS

TECHNICAL FIELD

This disclosure relates generally to systems and methods for processing images, and more particularly to processing images captured by dual photodiode (2PD) image sensors.

BACKGROUND OF RELATED ART

Image sensors may be capable of generating images captured from two or more perspectives. For example, a dual photodiode (2PD) image sensor may include a number of 2PD pixels, where each 2PD pixel includes two spatially separated photodiodes (a first photodiode and a second photodiode, such as a left photodiode and a right photodiode). Values or measurements for a 2PD pixel may include a luminance or brightness (intensity) measurement from the first photodiode and a luminance or brightness measurement from the second photodiode. For image capture applications where an image value is determined for each pixel of the sensor, the brightness measurements may be combined to provide a single value for the 2PD pixel and combined with a chrominance measurement in determining an image value for the pixel. For autofocus (AF) operations or depth related operations (such as depth mapping, real-time bokeh effects, etc.), the difference in measurements between the photodiodes (along with the distance between photodiodes) may be used in determining a phase difference or value used in determining an object depth.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for decorrelating one or more saturated regions of an image. In one example implementation, a method for decorrelating one or more saturated regions of an image is disclosed. The example method may include obtaining a first phase image and a corresponding second phase image, determining one or more saturated regions of the first and second phase images, applying a weight to each pixel in the one or more saturated regions of the first and second phase images to generate a weighted first phase image and a weighted second phase image, and performing one or more image processing operations on the weighted first and second phase images.

In another example, an image processing device configured to decorrelate one or more saturated regions of an image is disclosed. The example image processing device may include one or more processors, and a memory coupled to the one or more processors and including instructions for execution by the one or more processors. Execution of these instructions may cause the image processing device to obtain a first phase image and a corresponding second phase image, determine one or more saturated regions of the first and second phase images, apply a weight to each pixel in the one or more saturated regions of the first and second phase images to generate a weighted first phase image and a weighted second phase image, and perform one or more image processing operations on the weighted first and second phase images.

In another example, a non-transitory computer-readable medium is disclosed. The non-transitory computer-readable medium may store instructions that, when executed by a processor, cause a device to obtain a first phase image and a corresponding second phase image, determine one or more saturated regions of the first and second phase images, apply a weight to each pixel in the one or more saturated regions of the first and second phase images to generate a weighted first phase image and a weighted second phase image, and perform one or more image processing operations on the weighted first and second phase images.

In another example, an image processing device is disclosed. The device includes means for determining a first phase image and a corresponding second phase image, means for determining one or more saturated regions of the first and second phase images, means for applying a weight to each pixel in the one or more saturated regions of the first and second phase images to generate a weighted first phase image and a weighted second phase image, and means for performing one or more image processing operations on the weighted first and second phase images.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 4A depicts another example phase image including a plurality of saturated pixels.

FIG. 4B depicts an example pseudorandom weighting of the saturated pixels of the example phase image in FIG. 4A.

DETAILED DESCRIPTION

Figure 1:
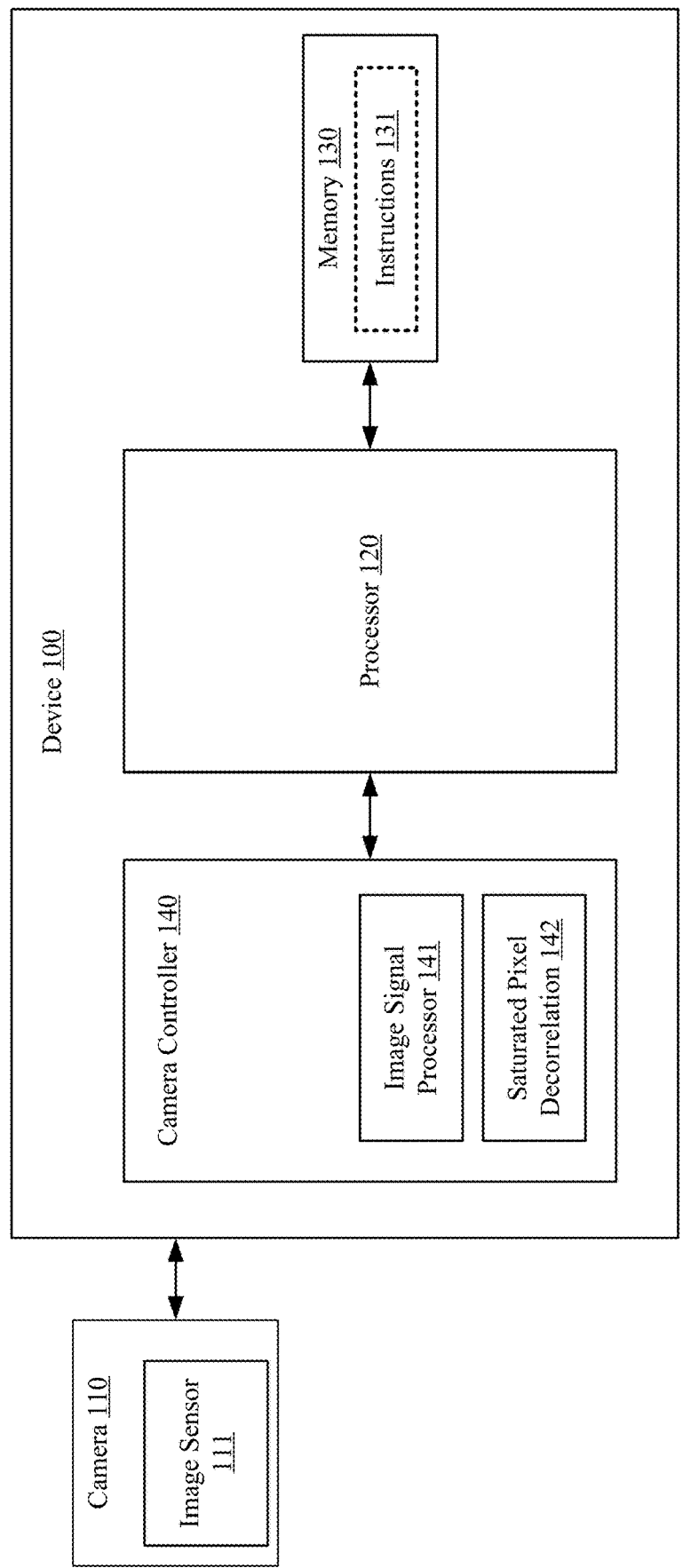
FIG. 1 is a block diagram of an example image processing device, according to some example implementations.

Aspects of the present disclosure may be used for improving image processing operations in dual photodiode (2PD) image processing systems. Autofocus (AF) operations using a 2PD sensor (for which a phase difference is determined for each 2PD pixel) may be negatively impacted if the measurements of one or more photodiodes are saturated. For example, AF may be slowed or a determined focal length may be incorrect as a result of the saturated values. In aspects of the present disclosure, pixels with saturated values may be identified, and a weighting function may be applied for the identified pixels to improve performance for image processing operations. Weighting may improve performance for a number of image processing operations, such as phase detection autofocus (PDAF) operations.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable image processing device (such as cameras, smartphones, tablets, laptop computers, or other devices) which capture or process images using one or more image sensors, such as one or more dual photodiode (2PD) image sensors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

As noted above, image sensors, such as 2PD image sensors, may include a number of 2PD pixels, allowing the image sensor capture images including image data from two or more perspectives. For example, each 2PD pixel in a 2PD image sensor may include two spatially separated photodiodes—a first photodiode and a second photodiode (e.g., left and right photodiodes). A first phase image may be captured using one of the photodiodes from the same perspective for each pixel of the 2PD image sensor (such as the left photodiodes for the pixels of the 2PD image sensor), and a second phase image may be captured using the photodiodes from the other perspective for each pixel of the 2PD image sensor (such as the right photodiodes for the pixels of the 2PD image sensor). The different perspectives between the phase images (from the distance between the photodiodes for each pixel) cause a parallax between the two phase images. Measurements of the parallax from the captured phase images may be used for image processing operations, such as for phase detection autofocus (PDAF) operations, for generating depth maps, and so on. However, saturated measurements in the phase images may degrade performance of image processing operations, such as PDAF. For example, saturation may cause the phase differences to be incorrect when comparing the separate phase images. It would therefore be desirable to improve the performance of image processing operations on phase images containing saturated values. In the following description, a pixel may correspond to a location in an image captured by a sensor, a location in the sensor, and/or a value (such as a luminance value) at the location in the image.

Example implementations may allow for decorrelating regions of saturated pixels in phase images using a weighting function. For example, a pseudorandom weight may be applied to pixels in the regions of saturated pixels. For example, such weights may be applied using suitable weighting functions. Application of appropriate weighting functions to decorrelate regions of saturated pixels may improve image processing, for example by allowing for more accurate focus detections using PDAF.

FIG. 1 is a block diagram of an example device 100, which may be used with the example implementations. In some implementations, the device 100 may include or be coupled to a camera 110, a processor 120, a memory 130 storing instructions 131, and a camera controller 140. The device 100 may optionally include or be coupled to a display, one or more input/output (I/O) components, a power supply, or a network interface, which may include a number of transceivers and a baseband processor (not shown for simplicity). The device 100 may additionally include or be coupled to additional cameras other than the camera 110.

The camera 110 may be capable of capturing individual image frames (such as still images) and/or capturing video (such as a succession of captured image frames). The camera 110 may include an image sensor 111. The camera 110 may include additional image sensors, such as for a dual camera module, or another suitable module with multiple image sensors. The image sensor 111 may be a 2PD image sensor, or another suitable one or more image sensors capable of capturing images using information from two or more perspectives.

The memory 130 may be a non-transient or non-transitory computer-readable medium storing computer-executable instructions 131 to perform all or a portion of one or more operations described in this disclosure.

The processor 120 may be one or more suitable processors capable of executing scripts or instructions of one or more software programs (such as instructions 131) stored within the memory 130. In some aspects, the processor 120 may be one or more general-purpose processors that execute instructions 131 to cause the device 100 to perform any number of functions or operations. In additional or alternative aspects, the processor 120 may include integrated circuits or other hardware to perform functions or operations without the use of software. While shown to be coupled to each other via the processor 120 in the example device 100, the processor 120, the memory 130, and the camera controller 140 may be coupled to one another in various arrangements. For example, the processor 120, the memory 130, and the camera controller 140 may be coupled to each other via one or more local buses (not shown for simplicity).

The camera controller 140 may include an image signal processor (ISP) 141, which may be one or more image signal processors to process captured image frames or video provided by the camera 110. The ISP 141 may be configured to process phase images, such as phase images captured by image sensor 111, phase images retrieved from the memory 130, or phase images received via the network interface. In some example implementations, the camera controller 140 may also control operation of the camera 110, for example controlling operations of the camera 110 to capture phase images using the image sensor 111. In some aspects, the ISP 141 may execute instructions from a memory (such as instructions 131 of memory 130 or instructions stored in a separate memory coupled to the ISP 141) to process image frames or video captured by the camera 110 and/or control the camera 110.

In some example implementations, the ISP 141 may execute instructions for obtaining a first phase image and a corresponding second phase image. For example, the ISP may obtain the first and second phase images by controlling the camera 110 to capture the first and second phase images, or by retrieving the first and second phase images from a memory, such as memory 130 or another local memory, or by receiving the first and second phase images via a network interface. Further, the ISP 141 may execute instructions for decorrelating saturated pixels of the first and second phase images, as discussed below.

In some other aspects, the ISP 141 may include specific hardware to process image frames or video captured by the camera 110. In some example implementations, the ISP 141 may include a saturated pixel decorrelation circuit 142 for decorrelating saturated pixels of image frames or video, such as decorrelating saturated pixels of the first and second phase images. The ISP 141 may alternatively or additionally include a combination of specific hardware and the ability to execute software instructions.

In the following examples, the device 100 is described as performing one or more of the described processes. However, any suitable device may be used, and the device 100 is used for illustrative purposes only, and the present disclosure should therefore not be limited to a specific device.

As mentioned above, regions of saturated pixels in phase images may degrade performance, which may lead to incorrect results and poor performance in image processing operations. More particularly, these saturated pixels may cause errors in image metrics relating to such processing operations. For example, saturated pixels may lead to incorrect results for sum of absolute differences (SAD) metrics, which may be used for PDAF, depth map determinations, or other image processing applications for 2PD images.

Figure 2A:
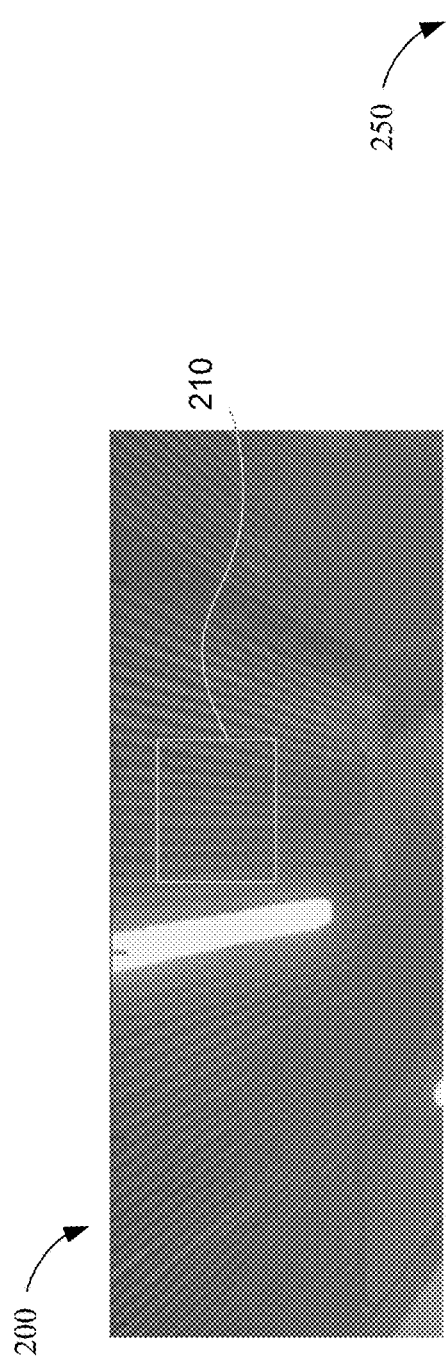
FIG. 2A depicts an example phase image including a plurality of saturated pixels.

FIG. 2A depicts an example phase image 200 including a number of saturated pixels. For example, phase image 200 may be a left phase image or a corresponding right phase image captured by a 2PD image sensor. Further, phase image 200 includes a number of saturated pixels corresponding to the fluorescent light depicted in the phase image 200. The example phase image 200 also includes a portion 210 which does not include any saturated pixels (such as not including any pixels with the depicted fluorescent light).

Figure 2B:
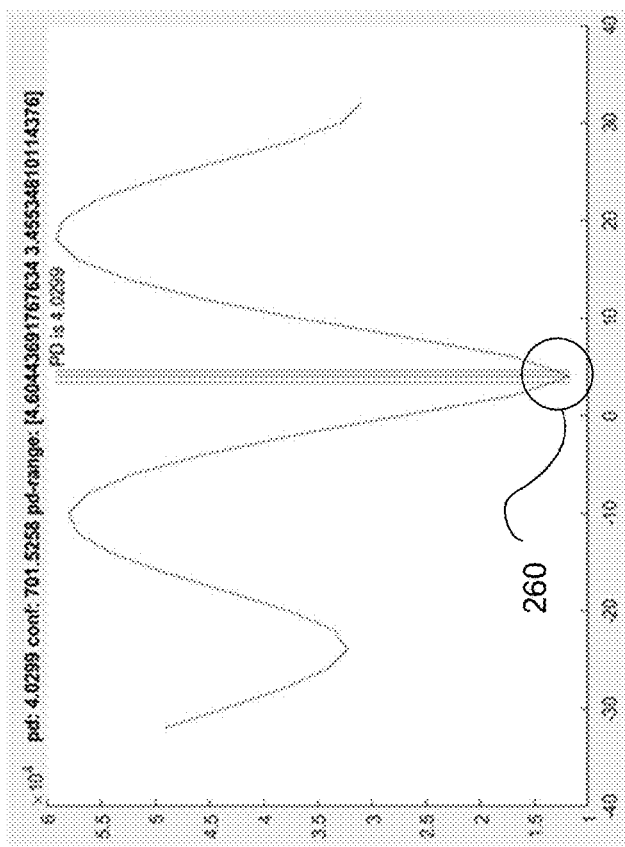
FIG. 2B depicts an example plot of a sum of absolute differences (SAD) metric for a portion of the phase image in FIG. 2A.

FIG. 2B depicts a plot 250 of an example SAD metric for the portion 210 of FIG. 2A, with the SAD plotted (on the y-axis) versus the phase difference (on the x-axis). The SAD metric may represent a sum of absolute differences between the phase image 200 of FIG. 2A and another phase image corresponding to the scene but from a different perspective. For example, if the phase image 200 is a left phase image captured by a 2PD image sensor, the SAD may be calculated between this left phase image and a corresponding right phase image captured by the 2PD image sensor. The phase difference may correspond to a shift of this left phase image relative to the right phase image. Thus, the plot 250 shows the SAD for a range of such phase differences. The minimum value of the SAD (depicted at 260) occurs at a phase difference of just over 4. This phase difference, shown on FIG. 2B as "PD," may be referred to as a minimum phase difference. The minimum phase difference may be used for a variety of image processing operations. For example, the minimum phase difference may be used to determine a focal length during PDAF. Similarly, the minimum phase difference value may correspond to a plane of focus for image processing operations incorporating depth maps, such as real time bokeh operations.

Figure 3A:
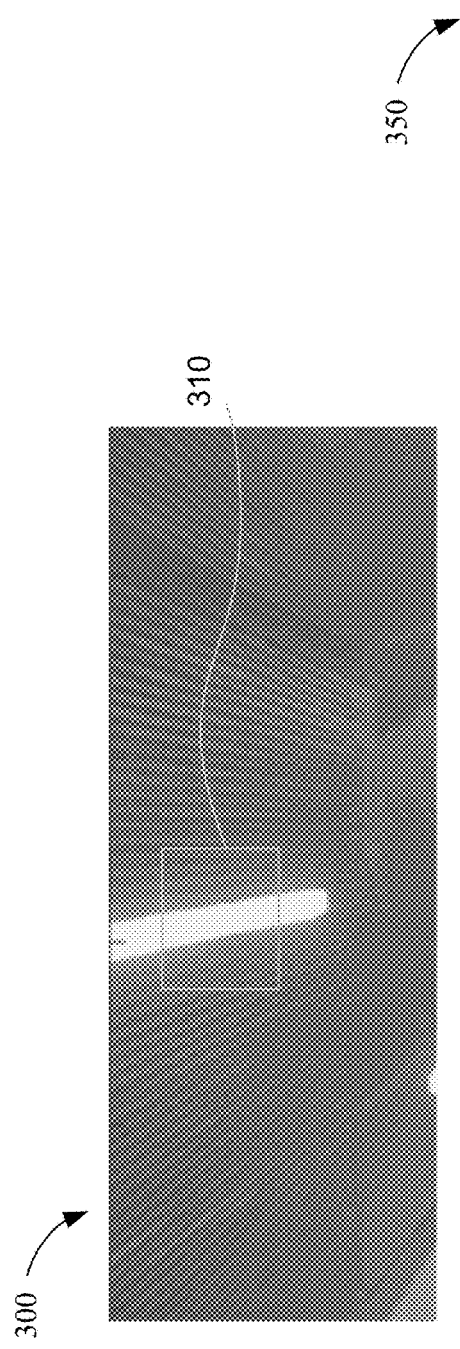
FIG. 3A depicts another example phase image including a plurality of saturated pixels.

FIG. 3A depicts another example phase image 300 including a number of saturated pixels. The phase image 300 includes the same scene as the phase image 200 in FIG. 2A. For example, the phase image 300 may be one of a left or right phase image captured by a 2PD image sensor. The phase image 300 includes a number of saturated pixels corresponding to the fluorescent light. The portion 310 of the example phase image 300 includes a portion of the saturated pixels (such as corresponding to the fluorescent light).

Figure 3B:
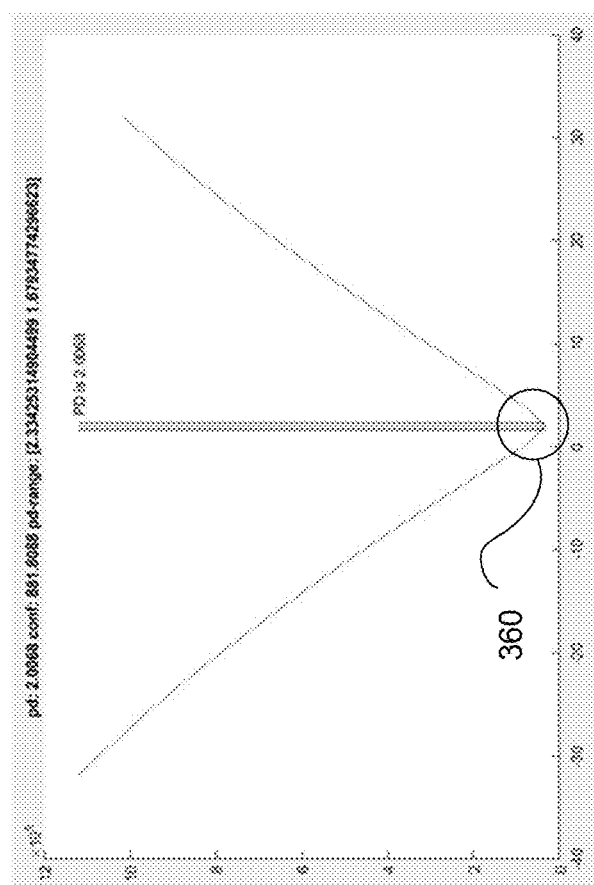
FIG. 3B depicts an example plot of a SAD metric for a portion of the phase image in FIG. 3A.

FIG. 3B depicts a plot 350 of the example SAD metric for the portion 310 of the example phase image 300 in FIG. 3A. The minimum of the SAD metric (depicted at 360) occurs at a phase difference of just over 2. In comparing the plot 250 in FIG. 2B and the plot 350 in FIG. 3B, the minimum SAD metric occurs at different phase differences (roughly 2 in FIG. 3B as compared to roughly 4 in FIG. 2B). Further, the shape and scale of the plotted SAD differ even though the objects shown in portions 210 and 310 are of similar distance from the camera. For example, while the range of values for SAD in FIG. 2B is roughly between 10^4 and 6×10^4, in FIG. 3B, this range is roughly between 1^5 and 12×10^5. The differences may be attributed to the high degree of correlation among the saturated pixels in portion 310, which may erroneously cause a higher degree of correlation for the saturated pixels than for unsaturated pixels. More particularly, because each saturated pixel may be similar to a number of other nearby saturated pixels, the two phase images may be correspondingly similar for a number of phase differences, which may result in the inaccurate minimum phase difference and the changed shape and scale of the plotted SAD.

The errors caused by saturation of pixels (as depicted in the differences between the plot 250 and the plot 350) may cause an incorrect focal length to be determined during PDAF, may cause PDAF to not be triggered, or may cause PDAF to take longer than if no pixels are saturated. Similar problems may occur for image processing operations incorporating depth maps.

Regions of saturated pixels may be decorrelated to reduce the disparities in the SAD metric versus phase difference. In some example implementations, one or more regions of saturated pixels may be identified within the phase images, and a weight may be applied to each pixel in the identified regions of saturated pixels. The weights may be applied, for example, according to a weighting function. The weights may be applied to a pixel intensity value for each pixel in the regions of saturated pixels. In some example implementations, the different weights applied to the pixel intensities may be independent. In this manner, the weight applied to a saturated pixel is not dependent on the weights applied to other saturated pixels. In some example implementations, the weights may be determined according to a pseudorandom function, a random function, or another suitable process.

In some example implementations for applying the weights to each saturated pixel, the device 100 may identify pixels of the phase images having at least a threshold intensity. The threshold intensity may be any suitable threshold, as pixels may not need to be fully saturated to affect the SAD metric. In one non-limiting example, the intensity threshold may be 90% of a maximum pixel intensity. The device 100 may then apply the weight by adjusting an intensity value for each identified pixel. For example, for each pixel having an intensity value greater than the intensity threshold, the device 100 may sequentially perform the following operations:

$$I_1(x,y)=I(x,y)*\text{randomNoiseStd}*\eta$$

$$I_2(x,y)=\max\{I_1(x,y),\text{minDataRange}\}$$

$$I_{weighted}(x,y)=\min\{I_2(x,y),\text{maxDataRange}\}$$

where $I(x, y)$ is the pixel intensity value at a pixel location (x,y) in a phase image, $I_{weighted}(x, y)$ is the weighted intensity value, randomNoiseStd is pseudorandom noise varying between zero and 1, $\eta$ is white noise, for example provided by an additive white Gaussian noise function, and minDataRange and maxDataRange are minimum and maximum allowable pixel intensity values, respectively. Note that while the above example is shown as including the pseudorandom noise and the white noise, other implementations may include only the pseudorandom noise. Further, minDataRange and maxDataRange may be any suitable values. For example, minDataRange may be zero for some implementations, and maxDataRange may be 1024 if the pixel intensity values are 10-bit values (maxDataRange may have other values for pixel intensity values having other bit lengths).

FIGS. 4A-4B depict an example application of a pseudorandom weighting function to a region of saturated pixels, according to some example implementations. FIG. 4A depicts an example phase image 400 including the ceiling and the fluorescent light in the example phase images 200 and 300. The pixels corresponding to the fluorescent light (such as in the region 410) may be saturated or approaching saturation. For example, the pixels in the region 410 may each have an intensity value of at least the threshold intensity, as described above. FIG. 4B depicts an example weighted phase image 450, wherein the intensities of the saturated and/or the near saturated pixels (such as in the region 460 corresponding to the region 410 of FIG. 4A) have been weighted as per the pseudorandom weighting function $I_{weighted}(x, y)$, described above. In this manner, the weighted pixels in the region 460 are less correlated than the pixels in the region 410. More particularly, while each saturated pixel in region 410 is highly correlated with other saturated pixels in the region 410, each pixel in region 460 may be quite different from other pixels in region 460, due to the application of the pseudorandom weighting function. The decorrelation may reduce errors introduced by saturation and improve determining image processing metrics such as the SAD.

Figure 5B:
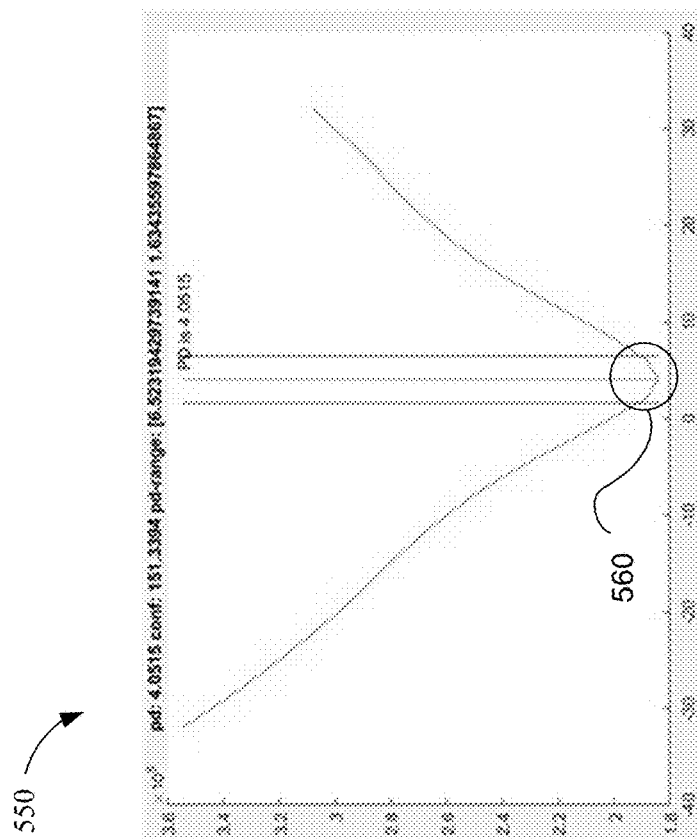
FIG. 5B depicts an example plot of a SAD metric for the portion including the saturated pixels of the example phase image from FIG. 4A after weighting of the example phase image in FIG. 4B.
Figure 5A:
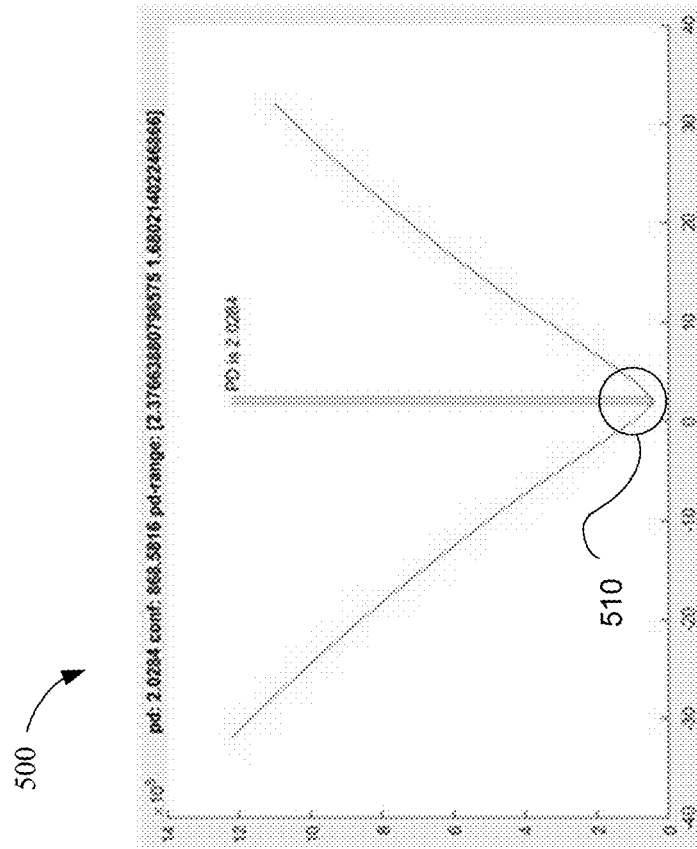
FIG. 5A depicts an example plot of a SAD metric for a portion including the saturated pixels of the example phase image in FIG. 4A.

FIGS. 5A-5B show two SAD plots 500 and 550, respectively depicting an example SAD metric for an image portion including saturated pixels before and after weighting. SAD plot 500 corresponds to the region 410 of FIG. 4A, while SAD plot 550 corresponds to the decorrelated region 460 of FIG. 4B. According to SAD plot 500, no saturated pixel weighting is applied, leading, as in FIG. 3B, to an incorrect minimum SAD value 510 at a phase difference of roughly 2. The plot 550 of the SAD is for the pixels after weighting has been applied (such as using the pseudorandom weighting described above). As seen with respect to FIG. 5B, the plot 550 indicates the correct location of the minimum SAD value 560 at a phase difference of approximately 4. Further, the shape and scale of the plot 550 of the SAD is closer to the expected shape and scale as compared to the plot 500. More particularly, the plot 550 has a shape and scale closer to the shape and scale of the plot 250 of FIG. 2B, including more of the curves corresponding to the patterned ceiling, and having SAD values closer to those depicted in FIG. 2B. In this manner, decorrelating the saturated pixels improves determining the location/phase difference for the minimum SAD.

Figure 6B:
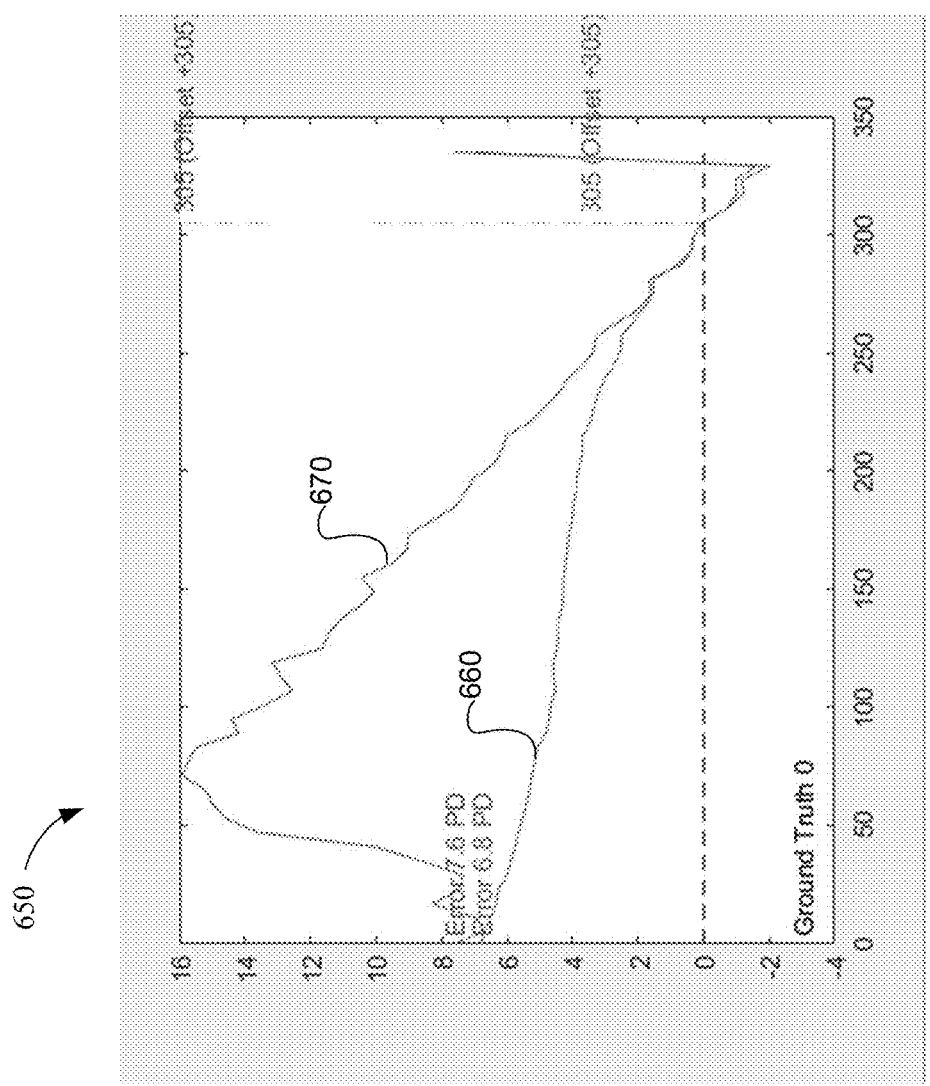
FIG. 6B depicts a plot of an example relationship between phase difference and camera lens position for the example phase image in FIG. 6A.
Figure 6A:
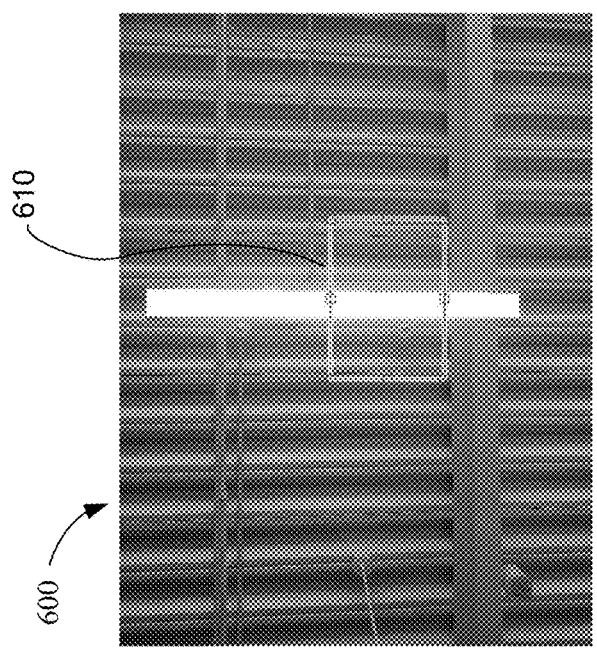
FIG. 6A depicts another example phase image including saturated pixels.

As discussed above, weighting regions of saturated pixels may improve the performance of image processing operations such as PDAF by decorrelating the saturated pixels. FIG. 6A depicts an example phase image 600 including a region of saturated pixels corresponding to a fluorescent light suspended from a ceiling (similar to the scene in FIGS. 2A and 3A). A portion 610 includes a number of the saturated pixels (such as corresponding to the fluorescent light). FIG. 6B shows a comparison plot 650 of phase differences vs. lens positions for the region 610 with and without saturated pixel decorrelation. FIG. 6B shows phase difference, on the y axis, for a range of possible lens positions/focal lengths, on the x axis. For PDAF, selecting the appropriate lens position/focal length may correspond to selecting the lens position/focal length where the phase difference is zero or closest to zero. The relationship between the phase difference and the lens position/focal length may be assumed to be a linear relationship (or another known relationship), and the focal length may be determined based on a measured phase difference and the known relationship between the phase difference and the focal length. Referring to FIG. 6B, a first plot 660 shows a phase difference vs the lens position for the portion 610 of FIG. 6A without saturated pixel weighting. A second plot 670 shows a phase difference vs the lens position for the portion 610 with saturated pixel weighting. In comparing the first plot 660 and the second plot 670, the second plot 670 is more linear and has a steeper slope as compared to the first plot 660. A shallower slope for the first plot 660 may slow PDAF by requiring more lens adjustments to reach focus, and conversely a steeper slope may improve the speed of PDAF by determining the lens position faster.

In addition to slowing PDAF, the lack of linearity of the first plot 660 may further cause overshoot or undershoot when selecting lens positions, as the slope of the first plot 660 is not consistent across all lens positions. Consequently, errors are introduced when estimating the lens position for the phase difference to be zero. For example, the slope of the plot at an initial lens position may correspond to a zero crossing at a first phase difference, but due to the lack of linearity the plot may actually cross zero at a second phase difference different from the first phase difference. Further, the errors in the SAD caused by the saturated pixels may cause autofocus not to be triggered when an image is not in focus, or may cause autofocus to be terminated without an image being in focus.

Figure 7:
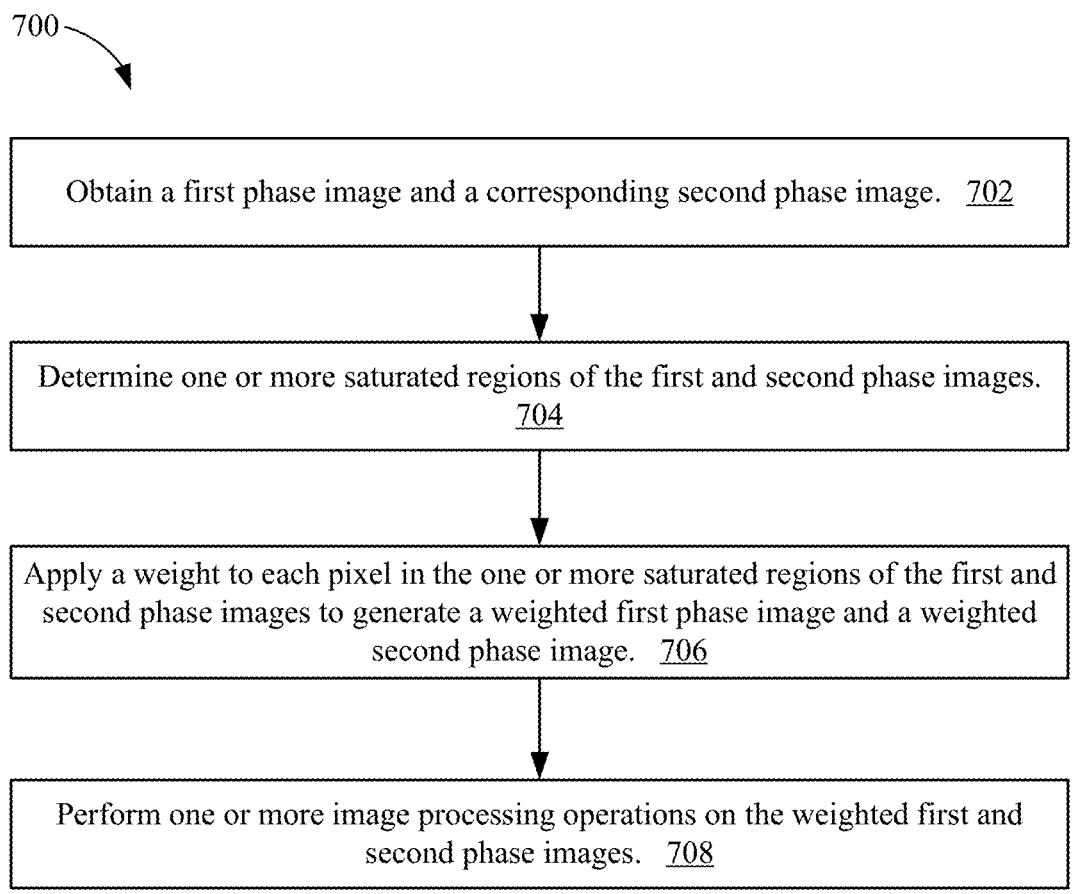
FIG. 7 is an illustrative flow chart depicting an example operation for decorrelating saturated regions of an image, according to some example implementations.

FIG. 7 is an illustrative flow chart depicting an example operation 700 for decorrelating one or more saturated regions of an image, according to the example implementations. The example operation 700 may be performed using any suitable image processing device, such device 100. However, other devices or systems may be used, and the present disclosure should not be limited by the examples or the description of implementation using the device 100.

With respect to FIG. 7, a device 100 may obtain a first phase image and a corresponding second phase image (702). As described above, obtaining the first and second phase images may include capturing the first and second phase images, for example using image sensor 111 of camera 110. Obtaining the first and second phase images may alternately include receiving the first and the second phase images from an external image sensor or retrieving the first and second phase images from a memory, such as memory 130 of FIG. 1, or from a memory external to device 100 (for example via a network interface). For example, the camera controller 140 of device 100 may control the image sensor to capture the first and second phase images. In some examples, the first phase image and the second phase image may correspond to a left phase image and a right phase image captured by a 2PD image sensor. The left phase image may be based on image data captured from left photodiodes of 2PD pixels of the 2PD image sensor, while the right phase image may be based on image data captured from right photodiodes of 2PD pixels of the 2PD image sensor.

The device 100 may next determine one or more saturated regions of the first and second phase images (704). In some examples, determining the one or more saturated regions may include determining that each pixel of the one or more saturated regions has at least a threshold intensity level.

The device 100 may then apply a weight to each pixel in the one or more saturated regions of the first and second phase images to generate a weighted first phase image and a weighted second phase image (706). In some example implementations, applying the weight may include applying a pseudorandom weight to the intensity of each pixel of the one or more saturated regions of the first and second phase images. In some example implementations, the weight may be clipped to a predetermined range of values. One example range is from greater than zero to less than a maximum pixel value, such as 1024. However, other suitable ranges may be used. Applying independent weights to pixels in the one or more regions (such as through application of a weighting function) may decorrelate the pixels of the one or more saturated regions.

The device 100 may then perform one or more image processing operations of the weighted phase images (708). In some examples, the one or more image processing operations may include a phase detection autofocus (PDAF) operation, or determining a depth map based on the weighted first and second phase images. The one or more image processing operations may be performed based at least in part on a sum of absolute differences (SAD) metric of the first and second weighted phase images.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 130 in the example device 100 of FIG. 1) comprising instructions that, when executed by the processor 120 (or the ISP 141), cause the device 100 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 120 or the ISP 141 in the example device 100 of FIG. 1. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the device 100, the processor 120, and/or the ISP 141, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for decorrelating one or more saturated regions of an image, the method comprising:
    obtaining a first phase image and a corresponding second phase image;
    determining one or more saturated regions of the first and second phase images;
    applying a corresponding pseudorandom weight to each pixel in the one or more saturated regions of the first phase image and the second phase image, to generate a weighted first phase image and a weighted second phase image; and
    performing one or more image processing operations on the weighted first and second phase images.

2. The method of claim 1, wherein the one or more image processing operations comprise a phase detection autofocus (PDAF) operation.

3. The method of claim 1, wherein the one or more image processing operations comprise determining a depth map based on the weighted first and second phase images.

4. The method of claim 1, wherein the weights are within a predetermined range.

5. The method of claim 1, wherein applying the corresponding pseudorandom weight to each pixel in the one or more saturated regions comprises applying a pseudorandom weighting function to an intensity value of each pixel in the one or more saturated regions.

6. The method of claim 1, wherein the one or more image processing operations are performed based at least in part on a sum of absolute differences (SAD) metric of the weighted first and second phase images.

7. The method of claim 1, wherein determining the one or more saturated regions comprises determining that each pixel of the one or more saturated regions has at least a threshold intensity level.

8. The method of claim 1, wherein applying the corresponding pseudorandom weight to each pixel in the one or more saturated regions decorrelates pixels of the one or more saturated regions.

9. The method of claim 1 wherein the image is captured by a dual photodiode (2PD) image sensor, and the first and second phase images correspond to a left photodiode image and a right photodiode image.

10. An image processing device configured to decorrelate one or more saturated regions of an image, comprising:
    one or more processors; and
    a memory coupled to the one or more processors and including instructions that, when executed by the one or more processors, cause the image processing device to:
    obtain a first phase image and a corresponding second phase image;
    determine one or more saturated regions of the first and second phase images;
    apply a corresponding pseudorandom weight to each pixel in the one or more saturated regions of the first phase image and second phase image to generate a weighted first phase image and a weighted second phase image; and
    perform one or more image processing operations on the weighted first and second phase images.

11. The image processing device of claim 10, wherein the one or more image processing operations comprise a phase detection autofocus (PDAF) operation.

12. The image processing device of claim 10, wherein the one or more image processing operations comprise determining a depth map based on the weighted first and second phase images.

13. The image processing device of claim 10, wherein weights are within a predetermined range.

14. The image processing device of claim 10, wherein execution of the instructions to apply the corresponding pseudorandom weight to each pixel on the one or more saturated regions further causes the image processing device to apply a pseudorandom weighting function to an intensity value of each pixel in the one or more saturated regions.

15. The image processing device of claim 10, wherein the one or more image processing operations are performed based at least in part on a sum of absolute differences (SAD) metric of the weighted first and second phase images.

16. The image processing device of claim 10, wherein execution of the instructions to determine the one or more saturated regions further cause the image processing device to determine that each pixel of the one or more saturated regions has at least a threshold intensity value.

17. The image processing device of claim 10, wherein execution of the instructions to apply the corresponding pseudorandom weight to each pixel in the one or more saturated regions further causes the image processing device to decorrelate pixels of the one or more saturated regions.

18. The image processing device of claim 10, wherein the first and second phase images correspond to a respective left photodiode image and a respective right photodiode image captured by a dual photodiode (2PD) image sensor, and the first and second phase images correspond to a left photodiode image and a right photodiode image.

19. A non-transitory, computer-readable storage medium storing instructions that, when executed by one or more processors of an image processing device, cause the image processing device to:
    obtain a first phase image and a corresponding second phase image;

determine one or more saturated regions of the first and second phase images;

apply a corresponding pseudorandom weight to each pixel in the one or more saturated regions of the first and second phase images to generate a weighted first phase image and a weighted second phase image; and perform one or more image processing operations on the weighted first and second phase images.

20. The non-transitory, computer-readable storage medium of claim 19, wherein the one or more image processing operations comprise a phase detection autofocus (PDAF) operation.

21. The non-transitory, computer-readable storage medium of claim 19, wherein the one or more image processing operations comprise determining a depth map based on the weighted first and second phase images.

22. The non-transitory, computer-readable storage medium of claim 19, wherein the weights are within a predetermined range.

23. The non-transitory, computer-readable storage medium of claim 19, wherein execution of the instructions to apply the corresponding pseudorandom weight to each pixel on the one or more saturated regions further causes the image processing device to apply a pseudorandom weighting function to an intensity value of each pixel in the one or more saturated regions.

24. The non-transitory, computer-readable storage medium of claim 19, wherein the one or more image processing operations are performed based at least in part on a sum of absolute differences (SAD) metric of the weighted first and second phase images.

25. The non-transitory, computer-readable storage medium of claim 19, wherein execution of the instructions to determine the one or more saturated regions further cause the image processing device to determine that each pixel of the one or more saturated regions has at least a threshold intensity value.

26. The non-transitory, computer-readable storage medium of claim 19, wherein execution of the instructions to apply the corresponding pseudorandom weight to each pixel in the one or more saturated regions further causes the image processing device to decorrelate pixels of the one or more saturated regions.

27. An image processing device, comprising:
means for obtaining a first phase image and a corresponding second phase image;
means for determining one or more saturated regions of the first and second phase images;
means for applying a corresponding pseudorandom weight each pixel in the one or more saturated regions of the first and second phase images to generate a weighted first phase image and a weighted second phase image; and
means for performing one or more image processing operations on the weighted first and second phase images.

* * * * *